(12) United States Patent
Martin (10) Patent No.: US 10,477,874 B1
(45) Date of Patent: Nov. 19, 2019

(54) TIDAL ROTATING OYSTER SHAPER AND CLEANER APPARATUS AND METHOD OF USE

(71) Applicant: Samuel Martin, Cape May, NJ (US)

(72) Inventor: Samuel Martin, Cape May, NJ (US)

( * ) Notice: Subject to any disclaimer, the term of this patent is extended or adjusted under 35 U.S.C. 154(b) by 0 days.

(21) Appl. No.: 16/241,257

(22) Filed: Jan. 7, 2019

(51) Int. Cl.
*A22C 29/00* (2006.01)
*A22C 29/04* (2006.01)

(52) U.S. Cl.
CPC .................... *A22C 29/043* (2013.01)

(58) Field of Classification Search
CPC ....... A22C 29/00; A22C 29/04; A22C 29/043; A22C 29/046
USPC ...................... 452/12, 13, 99, 106, 173, 198
See application file for complete search history.

(56) References Cited

U.S. PATENT DOCUMENTS

| | | | | |
|---|---|---|---|---|
| 3,037,237 A | * | 6/1962 | Lapeyre | A22C 29/04 452/13 |
| 3,909,971 A | * | 10/1975 | Wilde | A01K 61/54 43/6.5 |
| 4,538,327 A | * | 9/1985 | Einarsson | A22C 29/005 209/290 |
| 5,769,027 A | * | 6/1998 | Adams | A01K 61/54 119/238 |
| 6,508,699 B1 | * | 1/2003 | Santoriello | A22C 29/043 452/12 |
| 7,621,804 B1 | * | 11/2009 | Le | A22C 29/046 452/13 |

* cited by examiner

*Primary Examiner* — Richard T Price, Jr.
(74) *Attorney, Agent, or Firm* — Stuart M. Goldstein (57) ABSTRACT

A tidal rotating oyster shaper and cleaner apparatus has an outer frame, a containment cage supported by the outer frame, and a plurality of containers designed to hold oysters, the containers being located and maintained within the containment cage. A circular end member having outwardly extending teeth which circumscribes the end member, is mounted on each lateral end of the containment cage. At least one passive energy capturing pawl is configured to contact and engage the teeth, such that upon the introduction of a source of passive energy, the pawl is caused to rotate. This results in the rotation of the end members, the containment cage, and the containers, which thereby rotates the oysters within the containers. Continual rotation of the oysters serves to shape and clean the oysters.

14 Claims, 11 Drawing Sheets

TIDAL ROTATING OYSTER SHAPER AND CLEANER APPARATUS AND METHOD OF USE

RELATED APPLICATION

This application claims the benefit of provisional Pat. App. Ser. No. 62/618,799, filed on Jan. 18, 2018.

FIELD OF THE INVENTION

This invention relates to oyster shellfish aquaculture and specifically to the shaping and cleaning of oysters by tidal and current movement.

BACKGROUND OF THE INVENTION

To achieve shaping and cleaning of oysters during grow-out, oyster farmers utilize cages, baskets, bags, trays or other containers that are moved, operated, or handled solely by human interaction with the grow-out container. In addition, to achieve desired shape, tumbling is required to shape the oyster to a deep cup, rather than flat shell, for a bigger meat size per shell ratio. Some grow-out locations have bio-fouling problems that require oysters to be cleaned in tumbler washers or power washed in the containers. Bio-fouling occurs when organisms in the water column attach to the oyster, inhibiting growth and feeding opportunity. For example, this is the case with mud worms that settle on the oysters, creating a blanket of mud or silt over the oysters.

To achieve a survival grow-out to the marketplace, farmers must come into contact with the containers of oysters for tumbling and cleaning on a regular basis. As short an interval as every two weeks, depending on the location, may be necessary. If left alone, the oyster would be misshapen and undesirable for sale or result in mortality from bio-fouling.

The problems that are faced vary from farm to farm, depending on the grow-out location. In areas where bio-fouling is a major problem, farms must hire extra labor just to clean the oysters so that they survive. For inter-tidal grow out locations, pumps and hoses must be dragged around the farm to wash the oysters. Most farmers in sub-tidal (constantly submerged) grow-out locations use cages for the oysters to grow in while on the bottom. They also may be using containers inside of large cages. This requires lifting the containment structure off the bottom in order to clean the oysters in washers.

Tumbling for shape requires dumping each container into a land or vessel based tumbler, which chips some new growth to encourage the oyster to grow a deeper cup. Tumbling for shape in sub-tidal applications requires taking every container off the bottom and dumping them into a vessel based tumbler to chip new growth and wash the oyster. The washing needs to take place if the bio-fouling has proliferated, regardless whether or not the oysters need to be chipped for shaping.

There is a downside to chipping aggressively by tumbling oysters in a land or vessel based tumbler. The rate of speed at which oysters must be tumbled to get through the farm can be problematic. At aggressive tumbling speeds, oysters can be damaged to the point where they have broken the seal around the lip of the shell and must be put back in the water to repair themselves. If damaged too much, the oysters will die.

SUMMARY OF THE INVENTION

It is thus the object of the present invention to provide a Tidal Rotating Oyster Shaper and Cleaner (TROSC) apparatus which overcomes the limitations and disadvantages of existing devices and methods which shape and clean oysters.

This and other objects are accomplished by the present invention, a TROSC apparatus comprising an outer frame, a containment cage supported by the outer frame, and a plurality of containers designed to hold oysters, the containers being located and maintained within the containment cage. A circular end member having outwardly extending teeth which circumscribes the end member, is mounted on each lateral end of the containment cage. At least one passive energy capturing pawl is configured to contact and engage the teeth, such that upon the introduction of a source of passive energy, the pawl is caused to rotate. This results in the rotation of the end members, the containment cage, and the containers, which thereby rotate the oysters within the containers. Rotation of the oysters consistent with every other tidal or current cycle serves to shape and clean the oysters.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
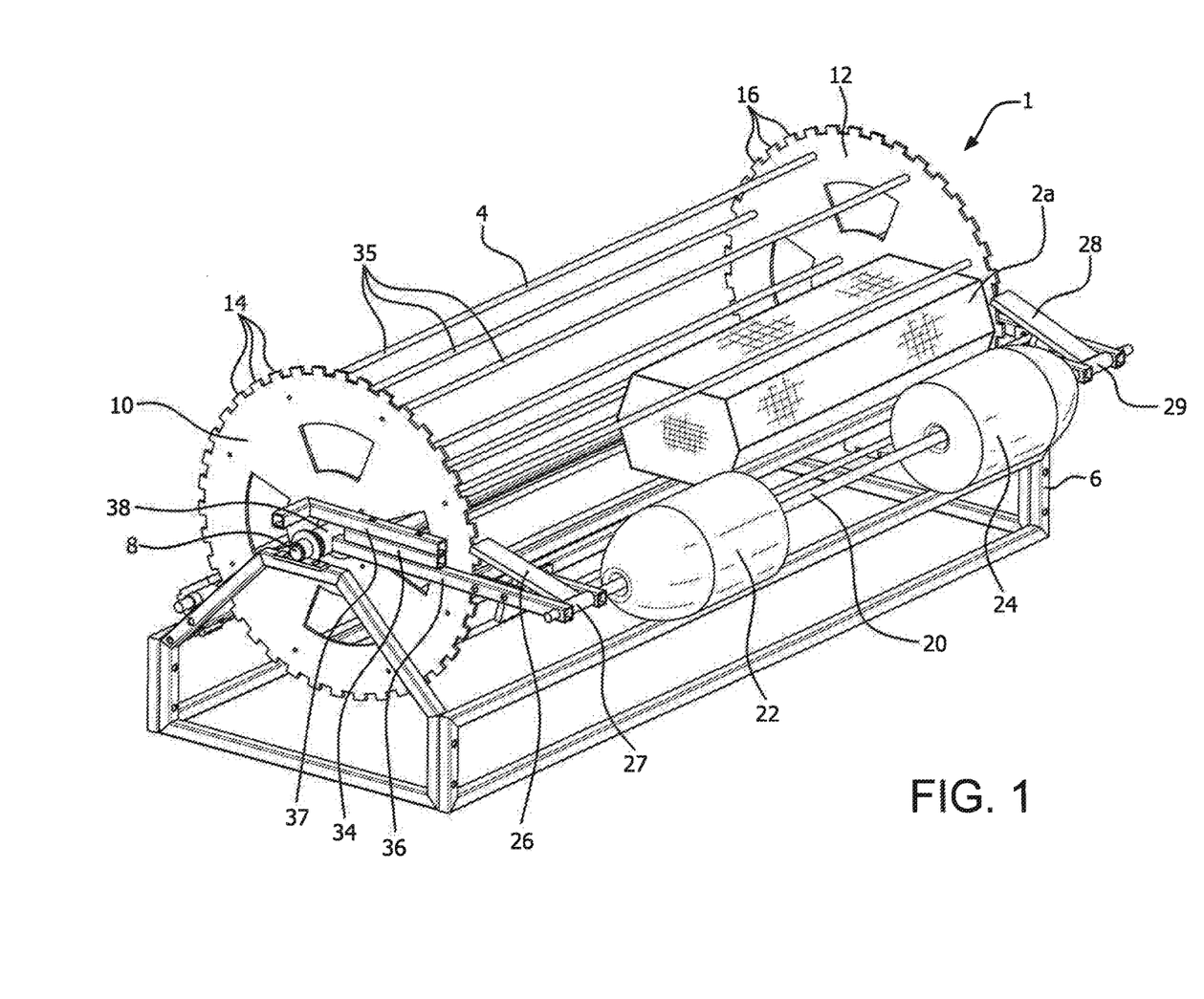
FIG. 1 is a front perspective view of a first embodiment of the Tidal Rotating Oyster Shaper and Cleaner (TROSC) apparatus of the present invention.
Figure 2:
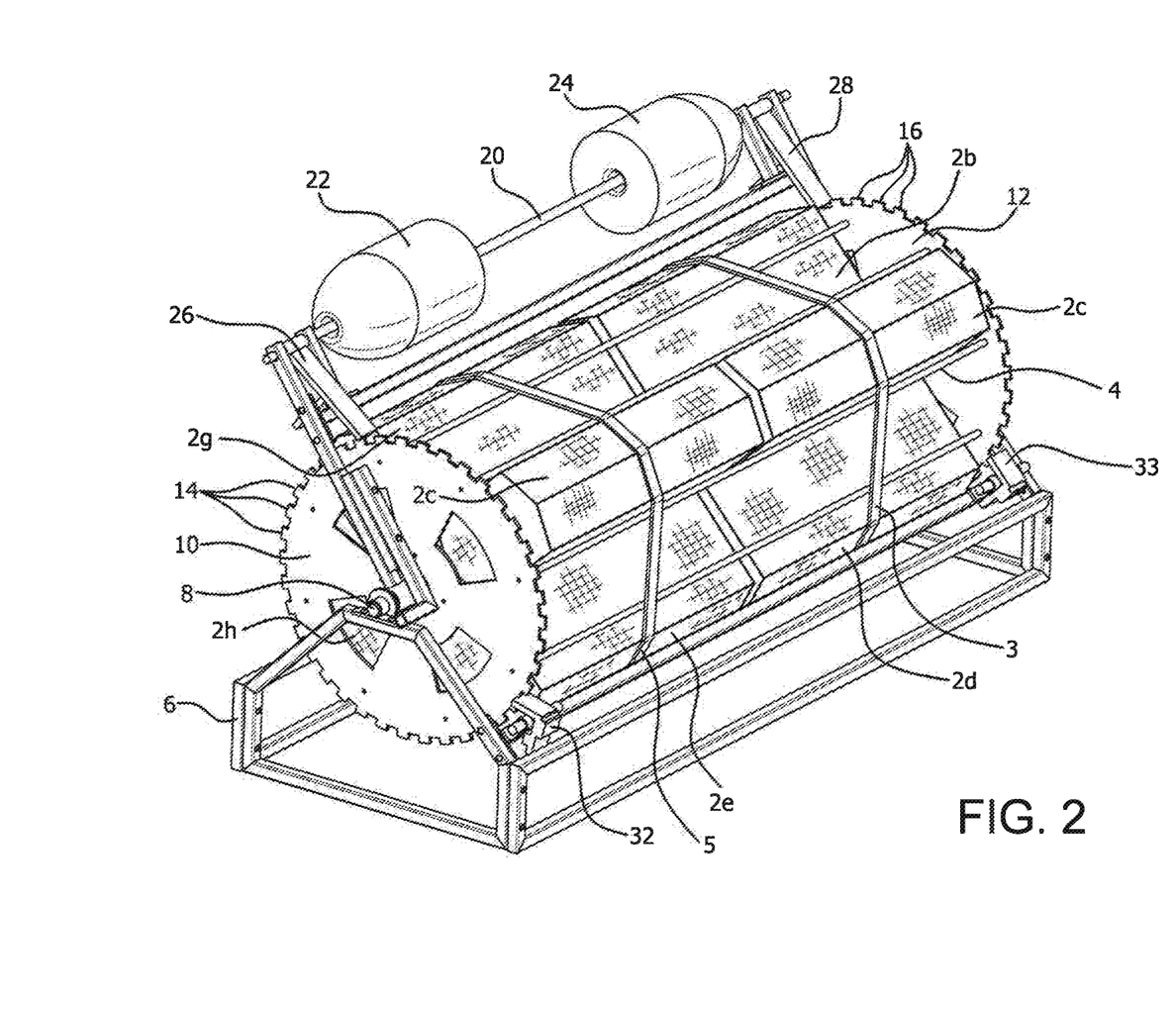
FIG. 2 is a rear perspective view of the TROSC shown in FIG. 1.
Figure 3:
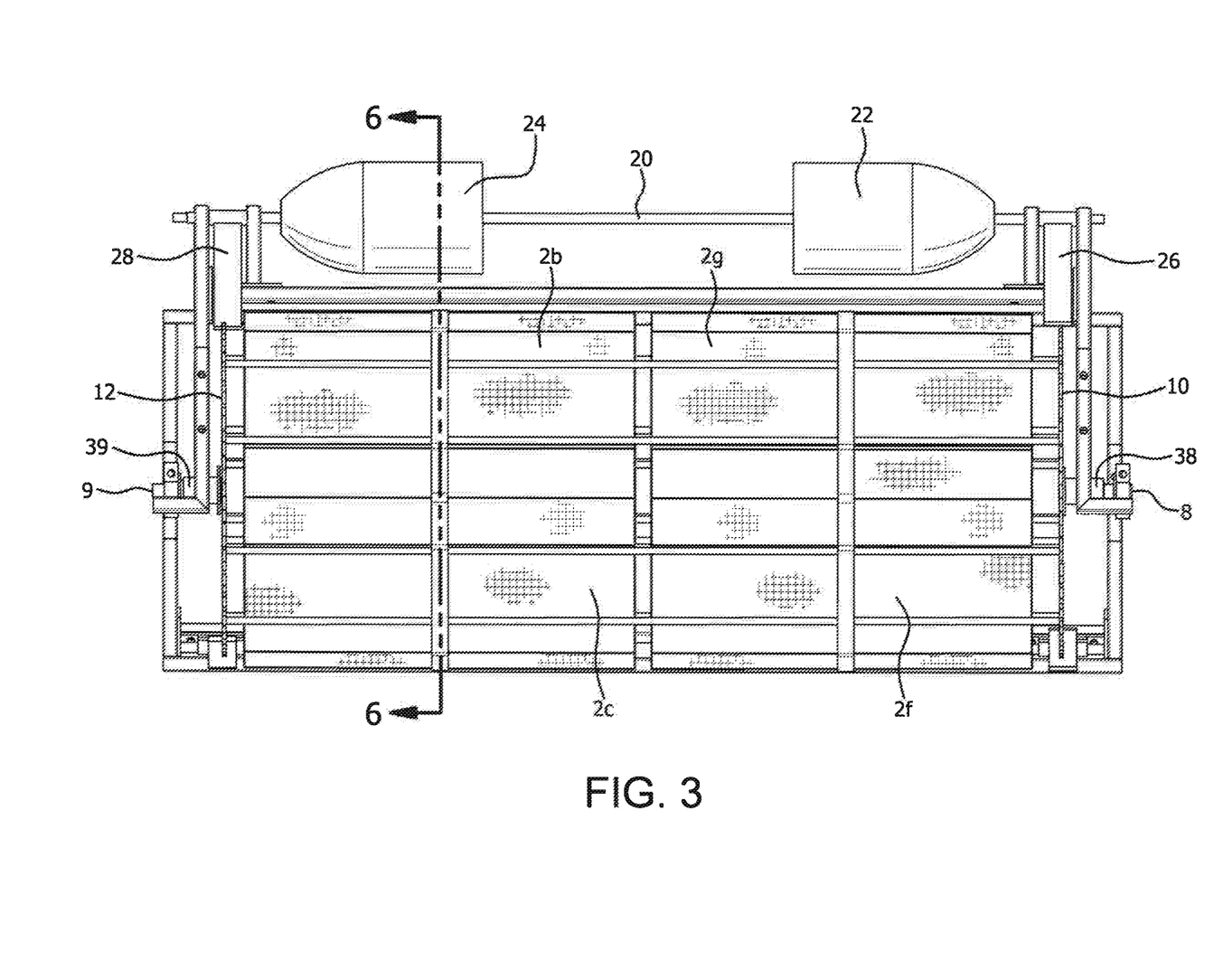
FIG. 3 is a top perspective view of the TROSC shown in FIG. 1.
Figure 4:
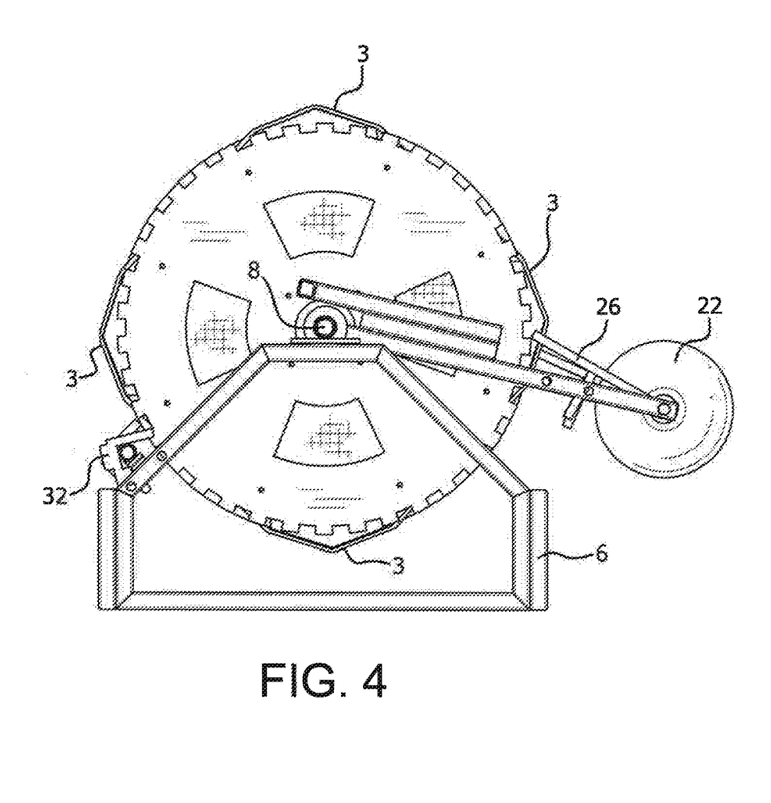
FIG. 4 is an elevation view of the TROSC shown in FIG. 1.
Figure 5:
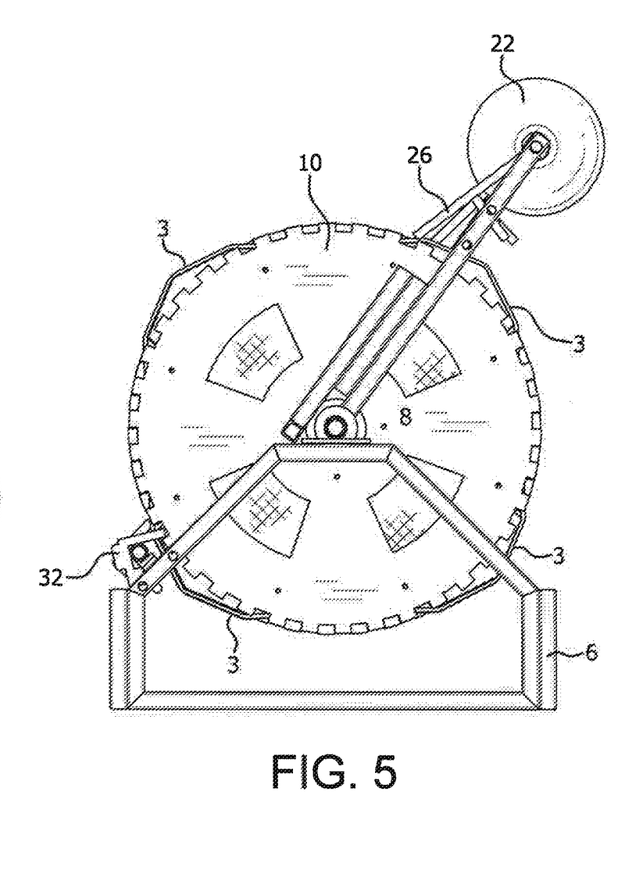
FIG. 5 is an elevation view of the TROSC apparatus illustrating the movement of the apparatus with a changing rising tide.
Figure 6:
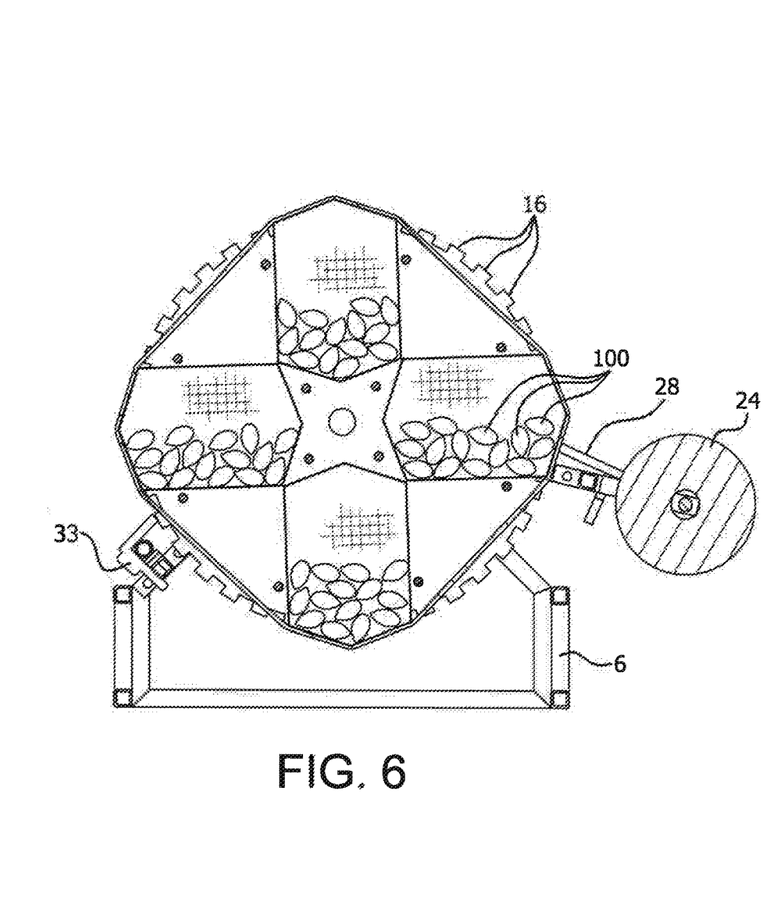
FIG. 6 is a cross-sectional view of the TROSC apparatus taken from FIG. 3.
Figure 7:
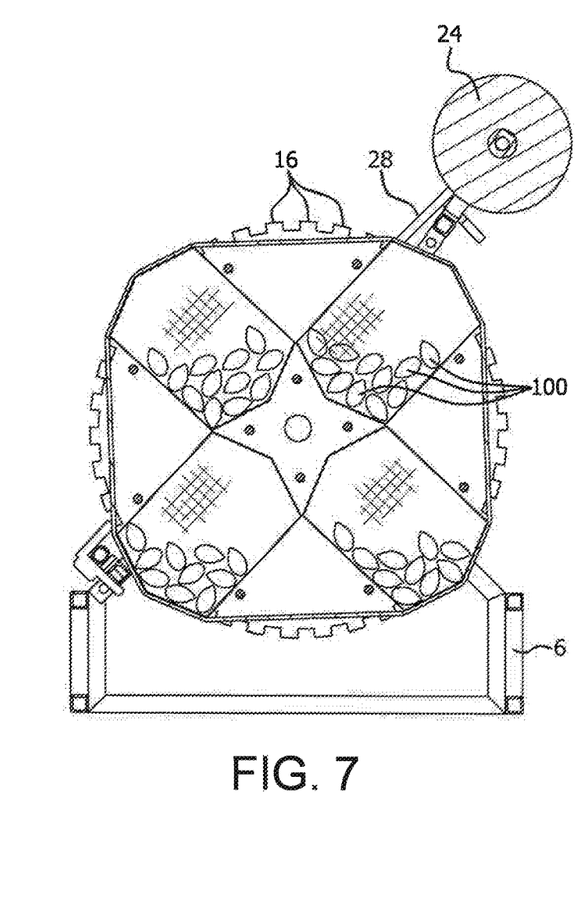
FIG. 7 is a cross-sectional view of the TROSC apparatus taken from FIG. 3 illustrating the movement of the apparatus and oysters as a result of the changing rising tide.

The Tidal Rotating Oyster Shaper and Cleaner (TROSC) apparatus 1 of the present invention comprises a plurality of individual containers 2a, 2b, 2c, 2d, 23, 2f, 2g and 2h located inside of tube or drum-like containment cage 4. Only container 2a is shown in FIG. 1. FIG. 2 illustrates eight containers located within containment cage 4, the containers being held in place by straps 3 and 5. Containment cage 4, configured to hold multiple containers, is supported by outer frame 6 via rotatable end stub shafts 8 and 9 which support and allow the containment cage to rotate on its longitudinal axis with every rising tide. Frame 6 holds containment cage 4 off of the grow-out floor base. Mounted on the lateral ends of containment cage 4 are end members, in this embodiment taking the form of circular plates 10 and 12 which have teeth 14 and 16, like gear wheels or sprockets, circumscribing each plate.

Horizontal float bar 20 outside containment cage 4 has floats 22 and 24 attached that create buoyancy as the tide rises vertically. Linear pawl members 26 and 28 are rotatably connected at ends 27 and 29 respectively to float bar 20. The other ends of pawls 26 and 28 contact teeth 14 and 16 of plates 10 and 12.

As seen in FIGS. 4-7, as the tide rises, the passive energy created by the change in tide causes floats 22 and 24 to be lifted. This causes float bar 20 to rise, which in turn rotates pawl members 26 and 28 upward. The rotation of pawl members 26 and 28 in contact and engaged with teeth 14 and 16, results in the rotation of plates 10 and 12 and hence containment cage 4 and the containers located within the containment cage. Most significantly, oysters 100 which are located in containers 2 are rotated and shifted around within the containers, where they are shaped and cleaned.

As the tide falls, anti-reverse stops 30 and 33 prevent containment cage 4 from reversing direction. Containment cage 4 is thus held in a static position while float bar 20 lowers with the falling tide, ratcheting back pawl members 26 and 28 across teeth 14 and 16 to their original, lower positions. Pawl members 26 and 28 are now again in position to rotate upon the next changing tide.

TROSC 1 can be manufactured in different sizes to hold more containers. In all its sizes, plates 10 and 12 on the lateral ends of containment cage 4 are connected by elongated rods or pipes 35 which make up outer frame 6. Lift arm members 34, 36 and 37 extend from horizontal float bar 20. Stub shafts 8 and 9 are bolted at either end of containment cage 4. Bearings 38 and 39 on each end of shafts 8 and 9 are bolted to the outside of frame 6 as well. The bearings allow for the rotation of containment structure 4.

Figures 12, 13:
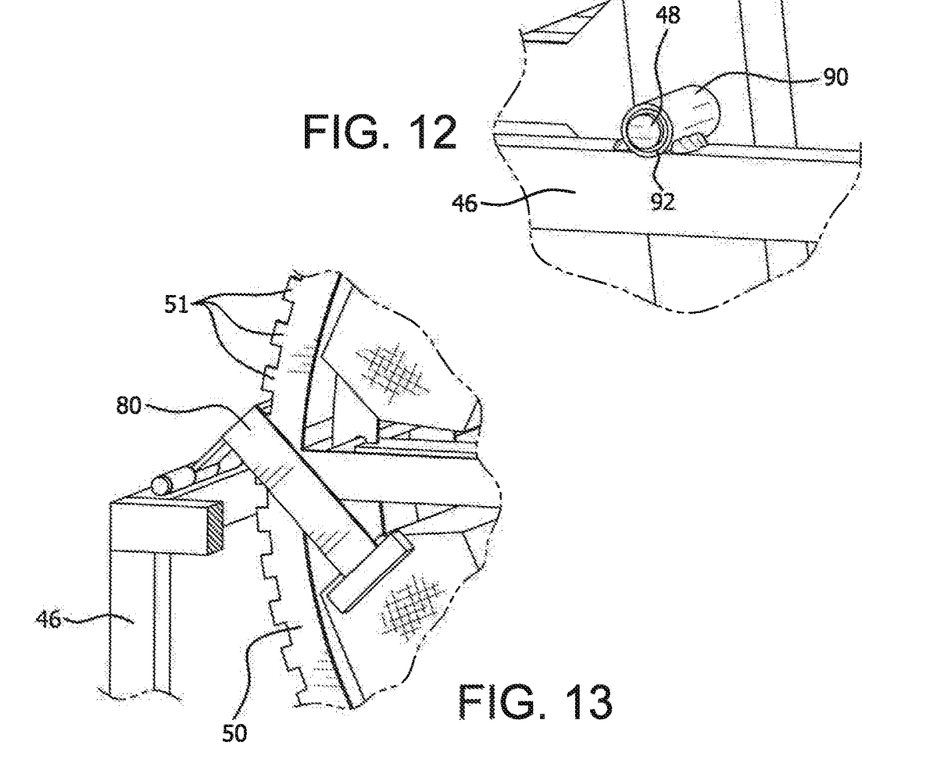
FIG. 12 is a section view taken from FIG. 9.
FIG. 13 is a section view taken from FIG. 9.

A second embodiment of the invention is provided for submerged, sub-tidal applications. See FIGS. 8-15. A single TROSC apparatus 40 comprises cylindrical, drum-like containment cage 41 made up of containment cage rings 44. Containment cage 41 is configured to hold a plurality of individual containers 42. Containment cage 41 is supported in part by outer frame 46 via rotatable through shaft 48, which allows the containment cage to rotate on its longitudinal axis with the movement of ocean currents. Shaft 48 is supported on frame 46 at ends 54 and 56 of the shaft. Shaft ends 54 and 56 are supported by bearings located within sleeves welded to frame 46. FIG. 12 shows one of the shaft ends in which bearing 92 circumscribes shaft 48 located within sleeve 90, which in turn is welded to frame 46.

Figure 8:
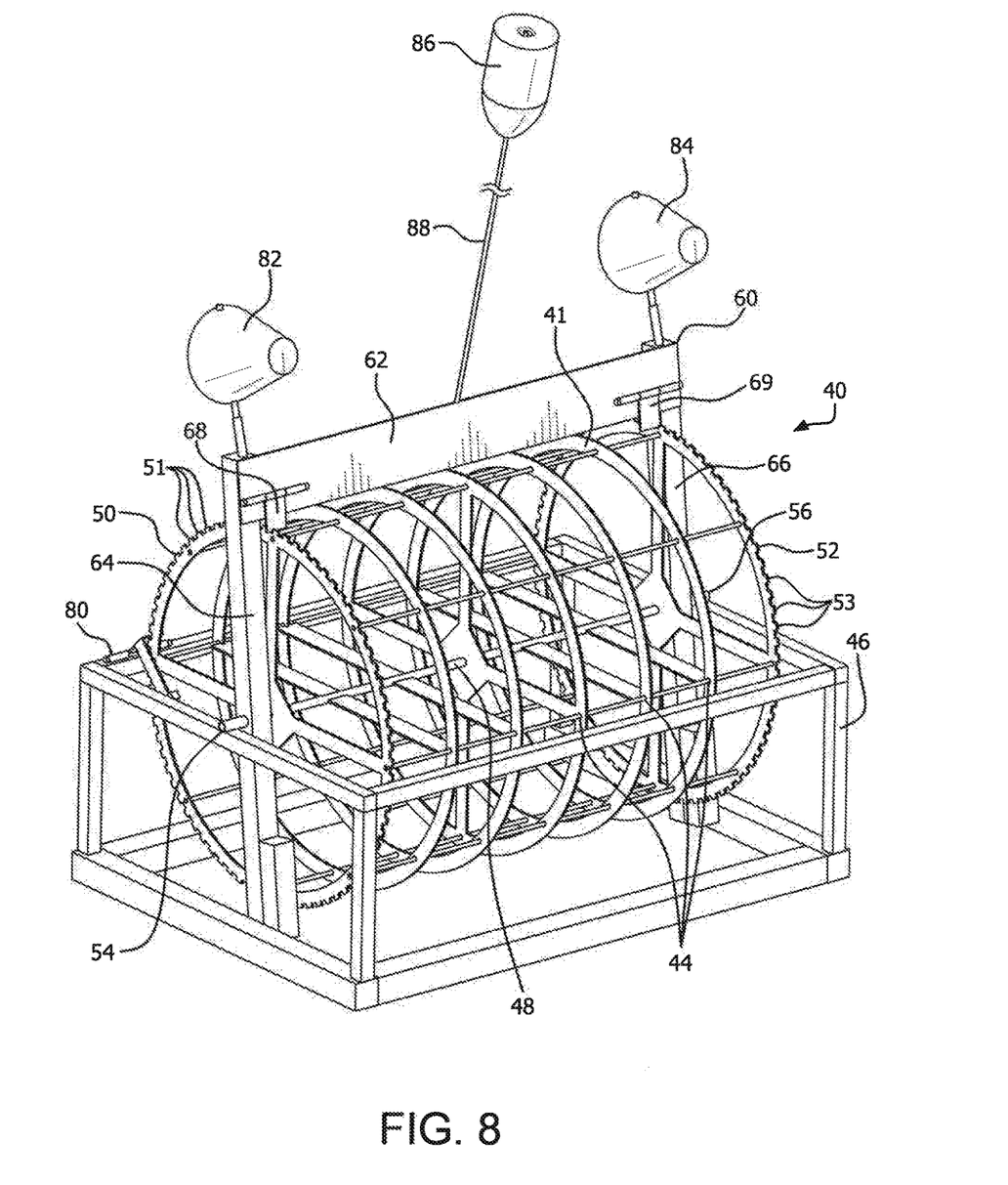
FIG. 8 is a front perspective view of a second embodiment of the TROSC apparatus, showing internal components of the apparatus.
Figure 9:
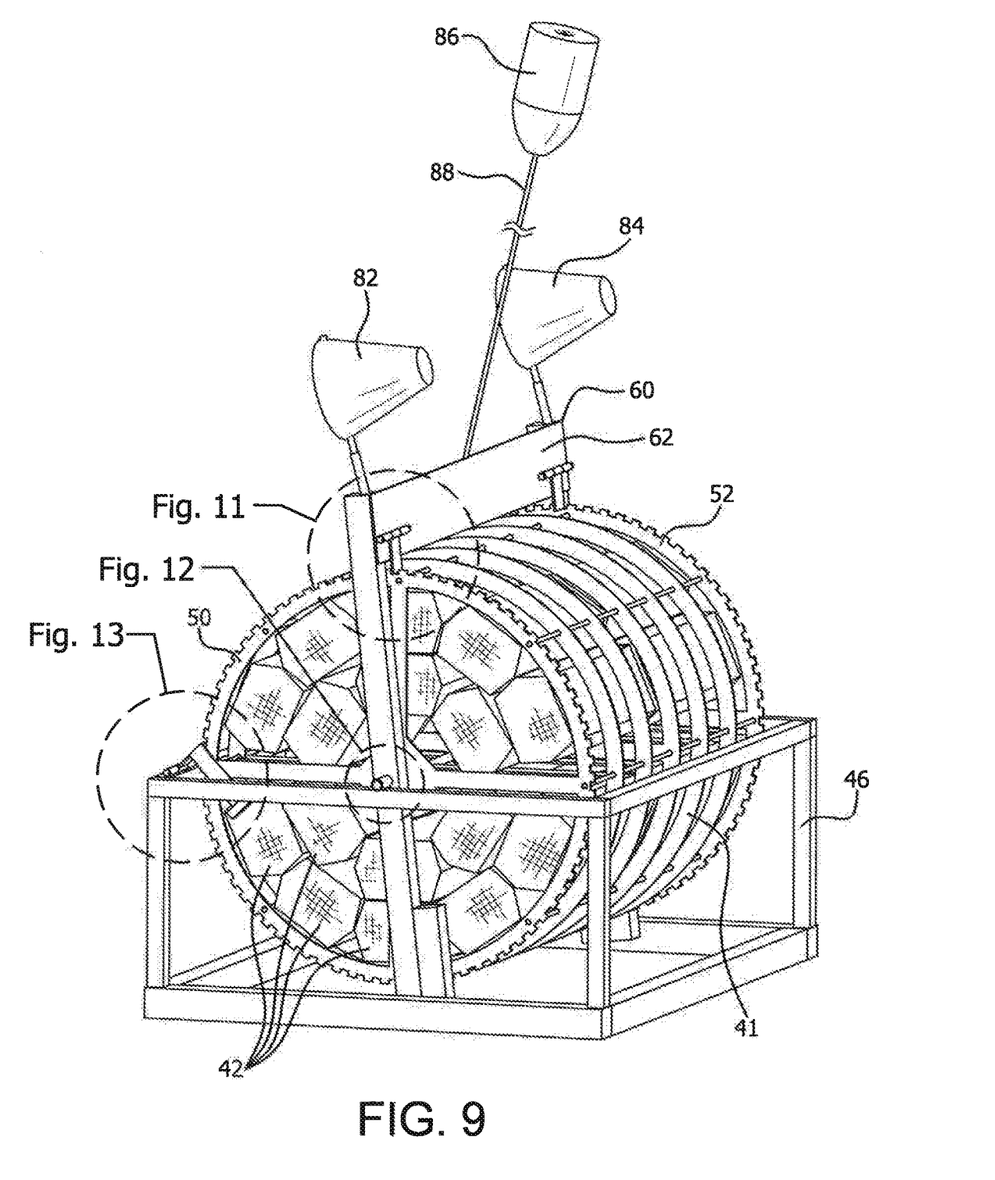
FIG. 9 is a side perspective view of the TROSC apparatus loaded with containers configured to hold oysters.
Figure 10:
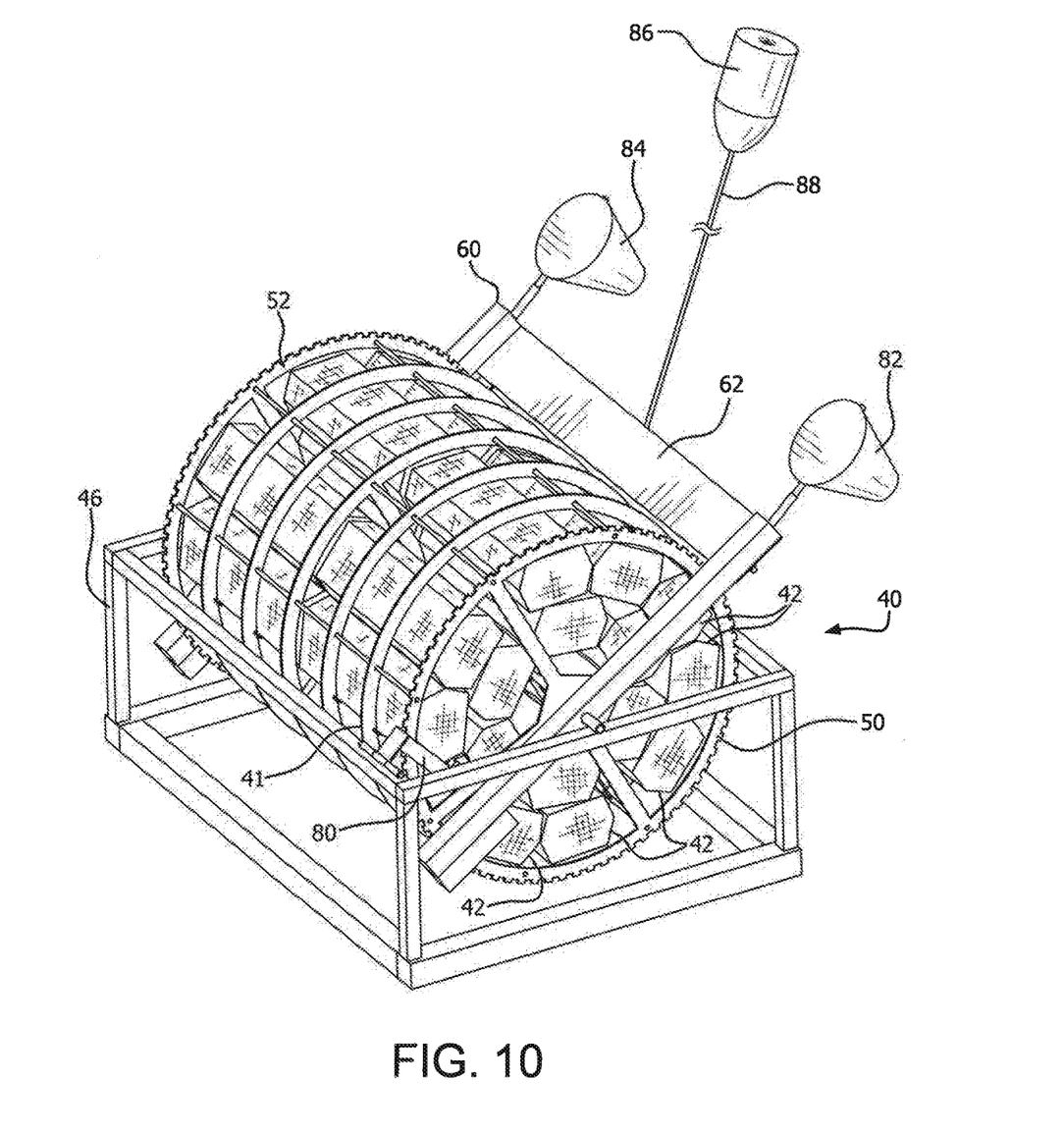
FIG. 10 is a rear perspective view of the TROSC apparatus loaded with containers configured to hold oysters.
Figure 11:
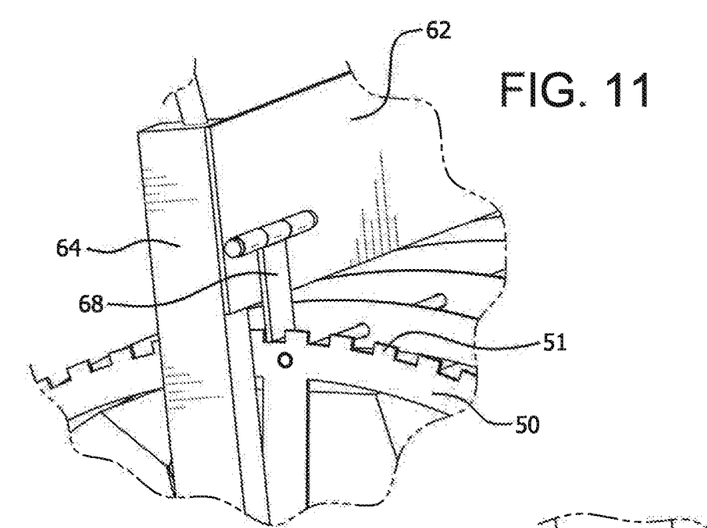
FIG. 11 is a section view taken from FIG. 9.

Mounted on the lateral ends of containment cage 44 are circular end members, in this embodiment taking the form of ring plates 50 and 52 which have teeth 51 and 53, like gear wheels or sprockets circumscribing each ring plate.

Pawl member 60 comprises energy capturing pawl bar 62 from which lateral swing arms 64 and 66 downwardly extend. Pawl plates 68 and 69 are pivotably attached to pawl bar 62. Swing arms 64 and 66 of pawl member 60 are rotatably connected near ends 54 and 56 of shaft 48, which allows the pawl member to rotate in tandem with the shaft. When pawl member 60 is connected to shaft 48, pawl plates 68 and 69 of pawl bar 62 contact teeth 51 and 53 of ring plates 50 and 52.

The passive energy resulting from the force of ocean currents impacts pawl member 60 and its pawl bar 62. This results in pawl member 60 rotating about shaft 48, causing pawl bar 62, via its pawl plates 68 and 69, to contact and engage teeth 51 and 53, resulting in the rotation of ring plates 50 and 52 and hence the rotation of containment cage 41 and containers 42 held within the containment cage. Oysters located in containers 42 are thereby rotated and shifted around within the containers, where they are shaped and cleaned.

As the direction of current changes, anti-reverse stop 80, connected to outer frame 46, prevents containment cage 41 from reversing direction. Containment cage 41 is thus held in a static position while pawl member 60 ratchets back across teeth 51 and 53 to its starting position. Pawl member 60 is now in its original position, waiting for the current to again change direction.

Passive energy capturing cones 82 and 84 can be attached to pawl member 60. These cones provide an optional means of increasing the energy capturing capacity of TROSC 40, thereby increasing the rotational efficiency and effectiveness of the system.

Marker buoy 86, attached by line 88 to pawl member 60, floats at the surface of the water. Buoy 84 serves as a lift and marker. The length of line 88 will determine the depth of water in which TROSC 40 is deployed. Line 88 can also be used to lift TROSC 40 out of the water for routine maintenance and oyster container grow-out density changes.

Figure 14:
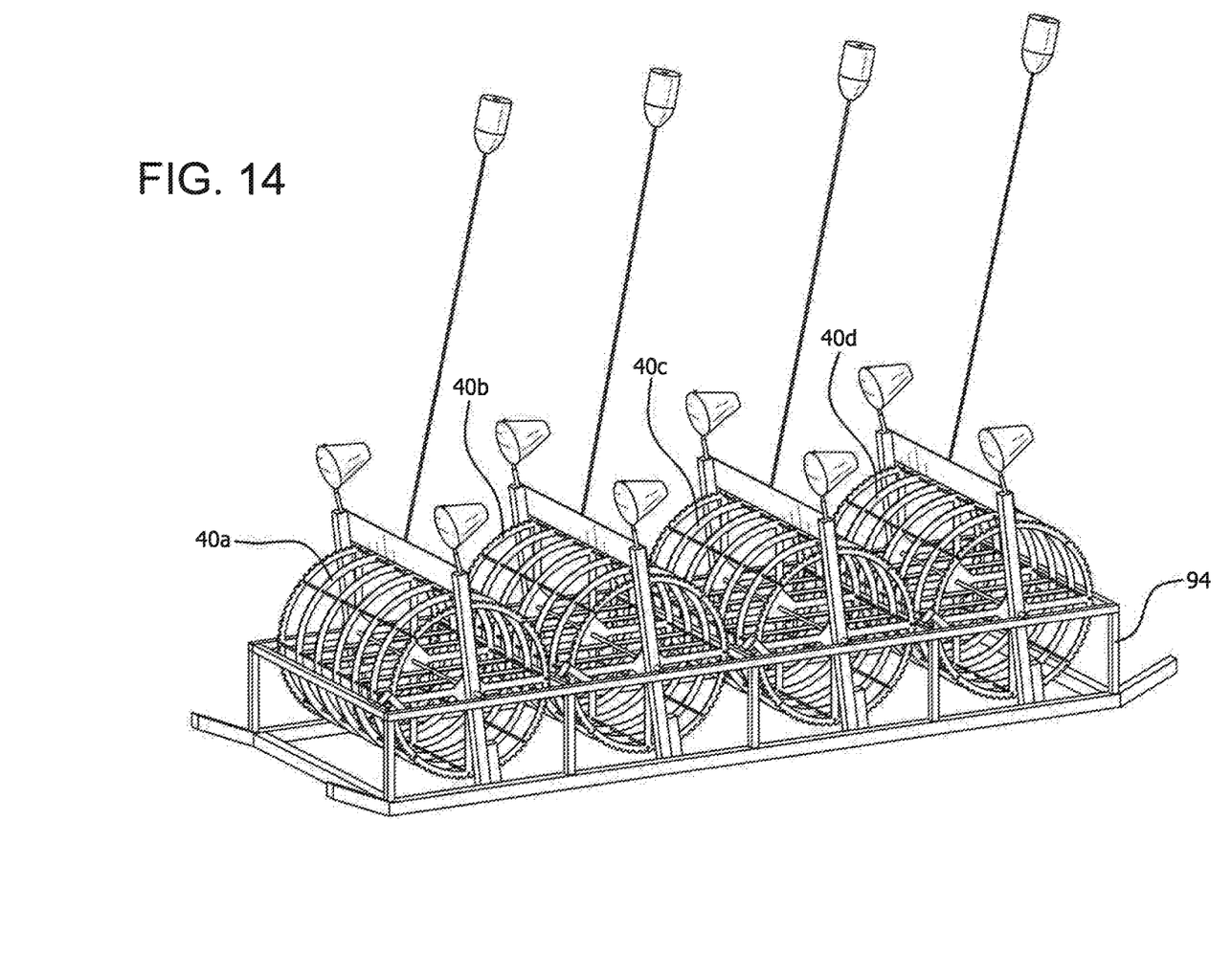
FIG. 14 is a perspective view of a plurality of TROSC apparatuses mounted in an outer frame.
Figure 15:
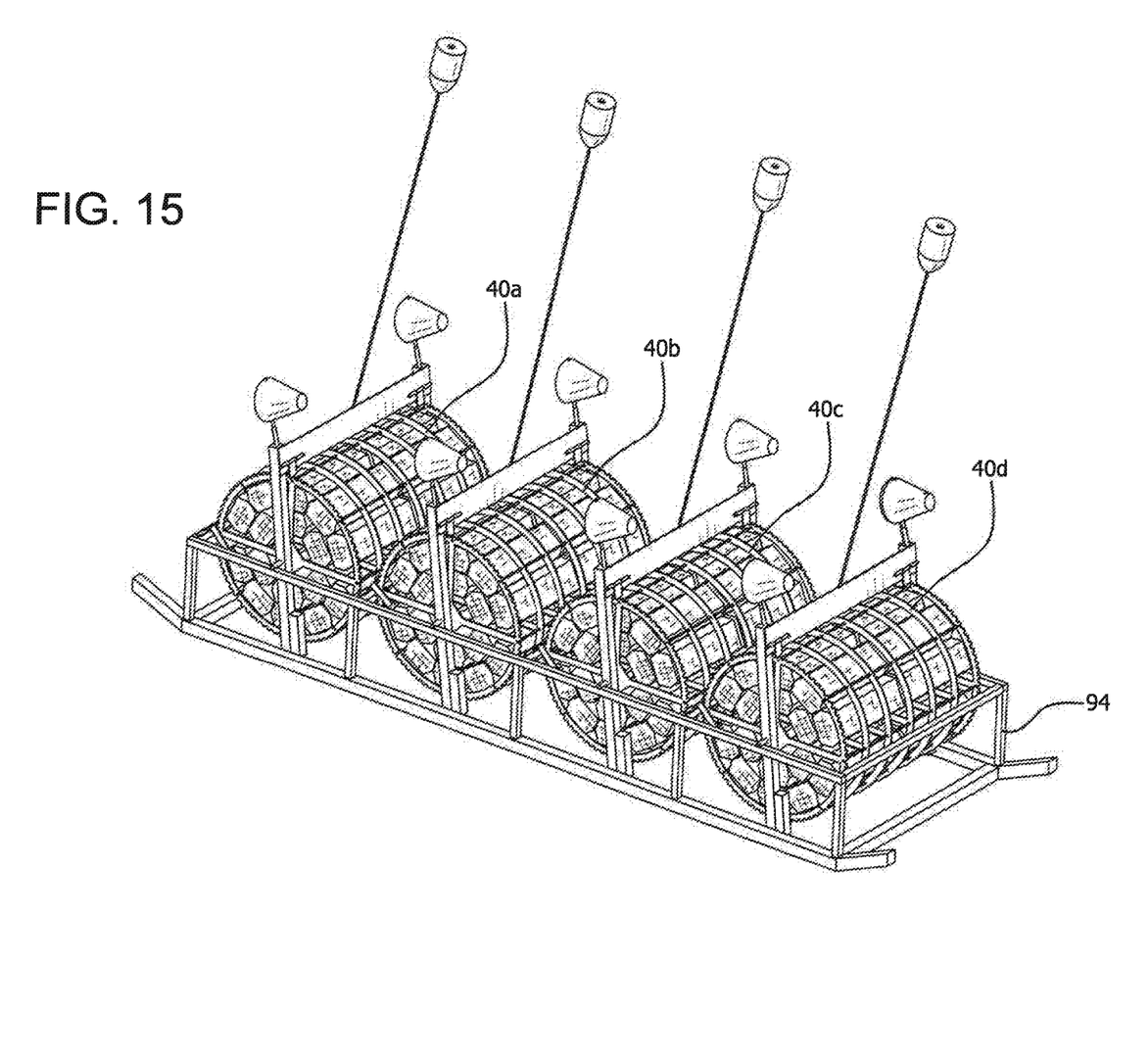
FIG. 15 is a perspective view of a plurality of TROSC apparatuses mounted in an outer frame and loaded with containers configured to hold oysters.

FIG. 14 shows a plurality of TROSC apparatuses 40a, 40b, 40c and 40d, mounted for placement on the ocean floor, on outer frame 94 which is large enough to support all the TROSC units. In this FIG., no containers are shown within the containment cages of the TROSC units. FIG. 15 shows each of the TROSC units filled with containers 42.

The movement of the TROSC apparatus of both embodiments tumbles oysters gently, but consistently, with every rising tide of nature and the naturally occurring passive energy of tidal currents. This creates a more consistent shape of the oysters. The tumbling effect also removes any biofouling that has set on the oyster, but has not had enough time to proliferate to hinder growth or cause mortality.

Use of the TROSC apparatus of the present invention reduces the number of vessels needed to operate an oyster aquaculture farm, when compared to a containment cage or like structure that uses manpower to wash and tumble oysters. The use of passive energy from the natural rising and falling tides replaces the excessive manpower required to clean and shape oysters. Reduction in manpower reduces impacts on the environment through carbon footprint as well.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A tidal rotating oyster shaper and cleaning apparatus configured to rotate by a source of passive energy, said apparatus comprising:
   an outer frame;

a containment cage supported by the outer frame, said containment cage having two lateral ends;

at least one container configured to hold oysters, said at least one container located and maintained within the containment cage;

a circular end member mounted on each lateral end of the containment cage, said end members each having outwardly extending teeth which circumscribe the end members;

at least one passive energy capturing pawl configured to contact and engage the teeth which circumscribe the end members on the lateral ends of the containment cage;

whereby upon the introduction of a source of passive energy to the apparatus, the pawl is caused to rotate in a first direction, thereby rotating the end members, the containment cage, and said at least one container within the containment cage.

2. The apparatus as in claim 1 wherein a plurality of containers are located and maintained in the containment cage.

3. The apparatus as in claim 1 further comprising an anti-reverse stop configured to prevent the end members, the containment cage, and said at least one container from rotating in other than the first direction.

4. The apparatus as in claim 1 comprising a first pawl located adjacent to one of the end members mounted on a lateral end of the containment cage and a second pawl located adjacent to the end member mounted on the other lateral end of the containment cage.

5. The apparatus as in claim 4 further comprising at least one buoyant float member, whereby upon said introduction of a source of passive energy to the apparatus, the float is lifted upward, resulting in the first and second pawls causing the rotation of the end members, the containment cage and said at least one container within the containment cage in the first direction.

6. The apparatus as in claim 5 wherein the source of passive energy is derived from changes of ocean tides.

7. The apparatus as in claim 1 wherein the end members are circular plates.

8. The apparatus as in claim 1 further comprising a rotatable shaft located at each end of the containment cage.

9. The apparatus as in claim 1 further comprising a rotatable shaft within the containment cage, extending between the end members.

10. The apparatus as in claim 9 wherein the pawl comprises an energy capturing bar having swing arms connected to the rotatable shaft, whereby upon said introduction of a source of passive energy to the apparatus, the bar and swing arm rotate the end members, the containment cage, and said at least one container in the first direction.

11. The apparatus as in claim 10 wherein the passive energy is derived from the force of underwater currents.

12. The apparatus as in claim 1 wherein the end members are circular ring plates.

13. A method of shaping and cleaning oysters comprising the steps of:

providing a rotating shaper and cleaning apparatus having a containment cage, at least one container located and maintained within the containment cage, and at least one passive energy pawl configured to rotate the containment cage;

partially filling said at least one container with oysters;

providing passive energy to impact the at least one passive energy pawl;

compelling the at least one passive energy pawl to rotate upon being impacted by the passive energy;

compelling the containment cage to rotate due to the rotation of the at least one passive energy pawl;

compelling said at least one container to rotate within the containment cage, upon rotation of the containment cage;

compelling the oysters within said at least one container to rotate, upon rotation of said at least one container, thereby shaping and cleaning the oysters in said at least one container.

14. The method as in claim 13, wherein a plurality of containers are located and maintained within the containment cage.

* * * * *